(12) United States Patent
Hori

(10) Patent No.: US 7,352,497 B2
(45) Date of Patent: Apr. 1, 2008

(54) IMAGE READING APPARATUS

(75) Inventor: Yuji Hori, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1028 days.

(21) Appl. No.: 10/610,867

(22) Filed: Jul. 2, 2003

(65) Prior Publication Data

US 2005/0078339 A1    Apr. 14, 2005

(30) Foreign Application Priority Data

Jul. 5, 2002    (JP) .............................. 2002-197469

(51) Int. Cl.
*H04N 1/04*    (2006.01)

(52) U.S. Cl. ...................... 358/482; 358/483; 358/443; 358/445; 358/450

(58) Field of Classification Search ................ 358/482, 358/483, 486, 474, 497, 505, 506, 487, 512–514, 358/443, 445, 450, 446; 250/208.1, 216, 250/234–236, 294, 298, 272, 276, 322, 323; 382/312, 399
See application file for complete search history.

(56) References Cited

U.S. PATENT DOCUMENTS

| | | | | |
|---|---|---|---|---|
| 5,767,901 A * | 6/1998 | Kimura | ...................... | 348/272 |
| 2004/0008387 A1* | 1/2004 | Ikeno | .......................... | 358/505 |
| 2004/0012829 A1* | 1/2004 | Takahashi | ................... | 358/474 |
| 2004/0047006 A1* | 3/2004 | Kato | .......................... | 358/474 |

\* cited by examiner

*Primary Examiner*—Cheukfan Lee
(74) *Attorney, Agent, or Firm*—Oliff & Berridge, PLC

(57) ABSTRACT

In an image reading apparatus, with respect to the first to third transfer clock signals for controlling shift registers in an image sensor, the second and third transfer clock signals have a cycle which is double the cycle of the first transfer clock signal, and the third transfer clock signal is shifted by a half cycle relative to the second transfer clock signal. Accordingly, the transfer timing of pixel signals in a second shift register is a half cycle shifted relative to the transfer timing in a third shift register, while the second and third shift registers operate with a transfer cycle which is double the transfer cycle of pixel signals in the first shift register. By this transfer control, the order of pixel signal output generally follows the order of the arrangement in the primary scanning direction of light receiving elements constituting the image sensor.

7 Claims, 8 Drawing Sheets

IMAGE READING APPARATUS

BACKGROUND OF THE INVENTION (1) Field of the Invention

The present invention relates to an image reading apparatus using an image sensor.

(2) Background Art

Conventionally, there are known examples of image reading apparatuses such as an image reading apparatus that reads an image from an original copy using a monochrome image sensor and then generates monochrome image data. Also, there is an image reading apparatus that reads an image from an original copy using a color image sensor and then generates color image data. These image reading apparatuses are incorporated, for example, in copying machines, fax machines and scanners.

Some image reading apparatuses switch allowing a choice between either a low resolution mode or a high resolution mode for outputting image data in low or high resolution, respectively, and make one of the modes operate according to a command signal input from an operating portion of a user interface.

An example of such conventional apparatuses having a plurality of modes is an apparatus that obtains image data in high resolution from an image sensor and generates image data in low resolution by skipping pixel data constituting the image data in high resolution.

Another example is an image reading apparatus which comprises an image sensor including a sensor having a plurality of light receiving elements in a primary scanning direction, a shift register for outputting the respective light reception signals obtained from the light receiving elements arranged at even-numbered positions among the light receiving elements constituting the sensor, and another shift register for outputting the respective light reception signals obtained from the light receiving elements arranged at odd-numbered positions, which generates, in the high resolution mode, image data in high resolution by using output signals from both of the shift registers, and generates, in the low resolution mode, image data in low resolution (specifically, half the resolution in the high resolution mode) by using output signals from one of the shift registers.

However, a conventional image reading apparatus of the former example which lowers the resolution by skipping image data involves a problem that the image reading speed of the image sensor is not improved even in the low resolution mode so that an advantage by lowering the resolution cannot be fully obtained.

A conventional image reading apparatus of the latter example provided with two shift registers also involves a problem that the needs of users who demand a wide variety of selectable resolutions cannot be fully satisfied since the selectable resolutions are only two, although the image processing speed can be effectively improved in the low resolution mode.

The inventors of the present invention devised an image reading apparatus by providing a conventional image reading apparatus of the latter example with an additional sensor disposed at a predetermined distance away from the above-mentioned sensor in a secondary scanning direction and having a plurality of light receiving elements whose light receiving positions are arranged between the respective light receiving elements of the above-mentioned sensor, and an additional shift register for outputting the respective signals obtained from the light receiving elements constituting the additional sensor (see FIG. 2).

Such an image reading apparatus is advantageous since the resolution can be switched among three selectable resolutions by combining two sensors and three shift registers and the image processing speed may be improved depending on the resolution.

For example, when each sensor is set to be able to read with a resolution of 600 dpi in the primary scanning direction, the image reading apparatus as above can generate image data with a resolution of 1200 dpi by using all the signals obtained from the three shift registers, generate image data with a resolution of 600 dpi by using the signals obtained from the additional shift register and generate image data with a resolution of 300 dpi by using the signals obtained from the shift register for outputting the respective light reception signals of the light receiving elements arranged at even-numbered (or odd-numbered) positions.

The image reading apparatus of this type, however, involves the following problem. When the three shift registers are made to operate in the same transfer clock, the order of pixel signals obtained from the image sensor deviates substantially from the order of arrangement of the light receiving elements in the primary scanning direction as time passes, as shown in FIG. 8. Therefore, in the process to sequentially convert the pixel signals obtained from the image sensor into pixel data as digital signals and then rearrange the pixel data according to the original order, a complicated rearrangement process is required. FIG. 8 is an explanatory view showing the state of pixel signals output from the shift registers of respective channels when the three shift registers are made to operate in the same transfer clock. Each number in parenthesis in FIG. 8 stands for the light receiving position in the primary scanning direction of the light receiving element corresponding to each pixel signal, i.e. the pixel position.

At the bottom of FIG. 8, the order of output of pixel data in the case of sequentially converting the pixel signals of a first channel (CH1) through a third channel (CH3) into pixel data and outputting the same is shown. As may be understood from FIG. 8, the order of output of pixel data is completely different from the order of arrangement of pixels in the primary scanning direction.

An object of the present invention, which has been made to solve these problems, is to provide an image reading apparatus that reads an image by using an image sensor having three shift registers, wherein rearrangement of pixel data may be performed easily.

SUMMARY OF THE INVENTION

The above and other objects are attained by an image reading apparatus that reads an image from the outside by controlling an image sensor which comprises the image sensor including: a first sensor having light receiving elements for respective pixels arranged in a primary scanning direction, a second sensor having light receiving elements for respective pixels which are arranged in the primary scanning direction and whose light receiving positions are set at a predetermined distance away from the first sensor in a secondary scanning direction and between the respective light receiving elements constituting the first sensor, a first shift register for transferring the respective pixel signals obtained from the respective light receiving elements constituting the first sensor and outputting the pixel signals according to the order of arrangement of the corresponding light receiving elements, a second shift register for transferring the respective pixel signals obtained from the respective light receiving elements arranged at even-numbered positions among the light receiving elements constituting the second sensor and outputting the pixel signals according to the order of arrangement of the corresponding light receiving elements, and a third shift register for transferring the respective pixel signals obtained from the respective light receiving elements arranged at odd-numbered positions among the light receiving elements constituting the second sensor and outputting the pixel signals according to the order of arrangement of the corresponding light receiving elements.

The image reading apparatus further comprises a transfer control device for shifting the transfer timing of the pixel signals in the second shift register by a half cycle relative to the transfer timing in the third shift register, while making the second and third shift registers operate with a transfer cycle which is double the transfer cycle of the pixel signals in the first shift register.

When the transfer timings of the respective shift registers are the same as in a prior art apparatus, the output order of the pixel signals in the image sensor becomes entirely different from the order of arrangement of the light receiving elements in the primary scanning direction. Therefore, in the process to digital convert the pixel signals into pixel data and rearrange the pixel data to generate an image data, complicated rearrangement is required.

In contrast, according to the image reading apparatus of the present invention, the above described operation of the transfer control device enables the order of the pixel signals output from the image sensor to generally follow the order of arrangement in the primary scanning direction of the light receiving elements constituting the first and second sensors. Therefore, rearrangement of the pixel data after digital conversion of the pixel signals may be performed easily.

In another aspect of the present invention, the image reading apparatus comprises a selective output device for obtaining the respective pixel signals output from the first, second and third shift registers and selectively outputting the respective obtained pixel signals to the outside according to the order of the light receiving positions of the light receiving elements corresponding to the pixel signals.

According to the image reading apparatus as above, in which the operation of the transfer control device enables the image sensor to output the pixel signals according generally to the order of arrangement in the primary scanning direction of the light receiving elements, the pixel signals may be selectively output according to the order of arrangement in the primary scanning direction of the corresponding light receiving elements with the selective output device provided. Thus, when generating image data by rearrangement of the pixel data, it is not necessary to rearrange the pixel data in the primary scanning direction although necessary in the secondary scanning direction, which facilitates rapid rearrangement.

In a further aspect of the present invention, the selective output device in the image reading apparatus is configured to output the pixel signals obtained from the first and second shift registers and the pixel signals obtained from the first and third shift registers alternately in accordance with the transfer cycle of the first shift register.

According to the above image reading apparatus, it is possible to output the pixel signals according to the order of arrangement in the primary scanning direction of the corresponding light receiving elements by the selective output device performing simple selective output operation repeatedly. Thus, the configuration of the selective output device may be simplified.

In another aspect of the present invention, the selective output device in the image reading apparatus may have two output channels to achieve selective output operation as described above, but may have only one output channel. When only one output channel is provided, the selective output device is configured to output the pixel signals obtained from the second and third shift registers with an output timing shifted by a half cycle relative to the output timing of the pixel signals obtained from the first shift register.

According to the above image reading apparatus, it is possible to output a group of pixel signals from the respective shift registers in a serial manner according to the order of arrangement in the primary scanning direction of the light receiving elements with a simplified configuration of the selective output device.

In yet another aspect of the present invention, the image reading apparatus is provided with an analog frontend IC having at least three channels and provided internally with analog amplifiers for the respective channels capable of adjusting the gains with respect to analog input signals, an analog/digital converter for converting the analog input signals into digital signals and outputting the digital signals, and a multiplexer for providing one of the analog input signals amplified by the respective analog amplifiers to the analog/digital converter, and the selective output device is achieved by using the analog frontend IC.

The selective output device in the image reading apparatus provides the respective pixel signals output from the first, second and third shift registers as the analog input signals to the analog amplifiers of the channels corresponding to the respective shift registers, and controls the multiplexer to selectively the respective pixel signals obtained from the respective amplifiers into the analog/digital converter according to the order of the light receiving positions of the light receiving elements corresponding to the respective pixel signals, whereby to selectively outputs the respective pixel signals to the outside through the analog/digital converter.

According to the above image reading apparatus, it is possible to output the pixel signals according to the order of arrangement of the corresponding light receiving elements under the control of the multiplexer, while performing appropriate signal processing to the pixel signals by adjusting the gains of the analog amplifiers. It is also possible to manufacture the image reading apparatus inexpensively since an existing analog frontend IC may be used. Furthermore, the use of an analog frontend IC results in the shortened length of the wiring in the circuits for converting pixel signals into digital signals, which may improve the resistance of the image reading apparatus to external noises.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
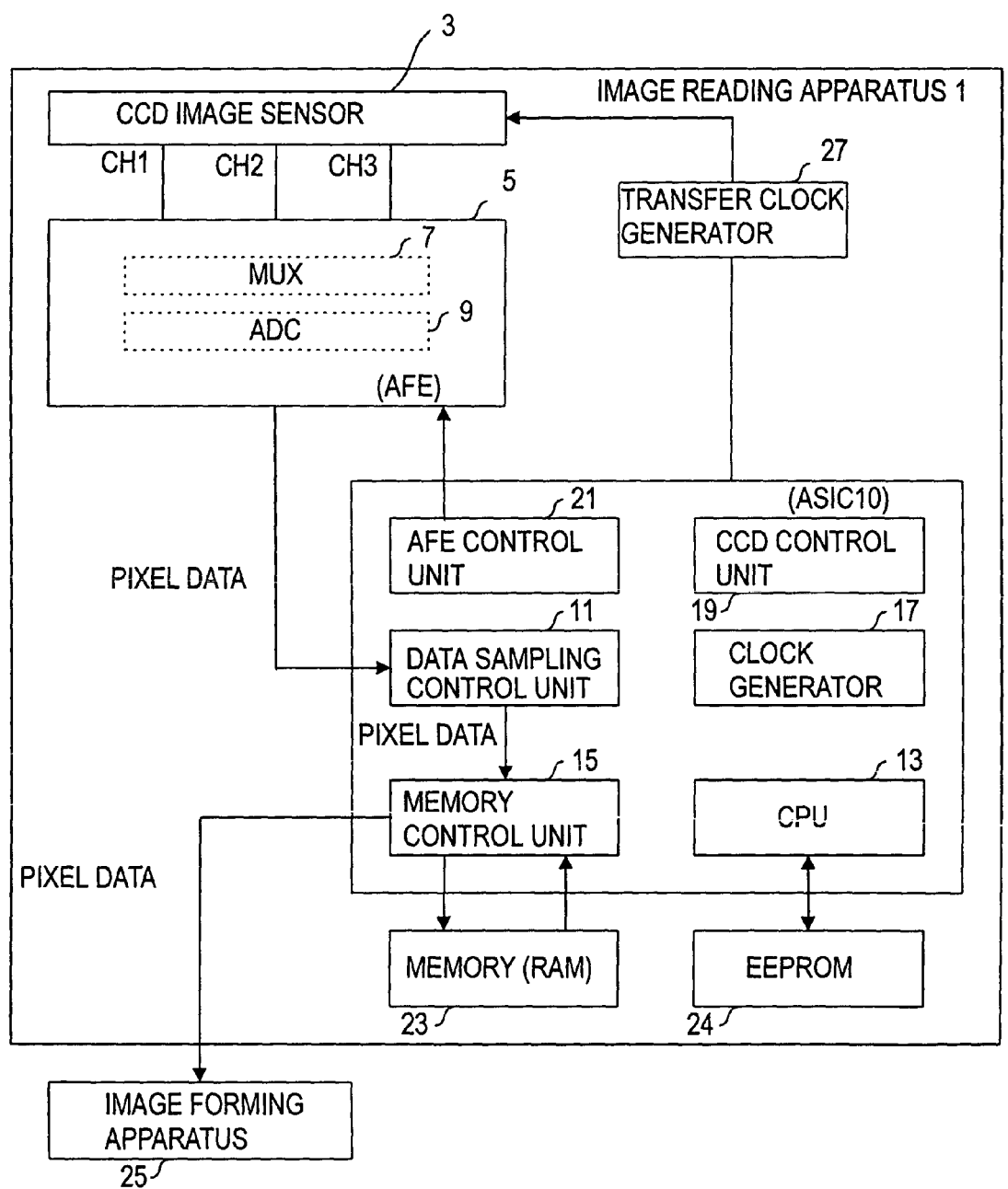
FIG. 1 is a schematic block diagram showing the configuration of an image reading apparatus according to the present embodiment.

Referring to FIG. 1, an image reading apparatus 1 according to the present embodiment is provided with a CCD (Charge Coupled Device) image sensor 3 and an analog frontend (AFE) IC 5, and reads an image from an original copy using the CCD image sensor 3 and provides pixel signals output from respective channels (CH1, CH2, CH3) of the CCD image sensor 3 during the image reading to the analog frontend IC 5.

The image reading apparatus 1 sequentially provides the pixel signals of the respective channels obtained from the CCD image sensor 3 to an analog/digital converter (ADC) 9 using a multiplexer (MUX) 7 in the analog frontend IC 5 to sequentially convert the pixel signals of the respective channels into pixel data as digital signals, and then provides the pixel data from the analog frontend IC 5 to a data sampling control unit 11 in an ASIC 10 as a serial data stream.

In the ASIC 10, a CPU 13 for comprehensively controlling the image reading apparatus 1, a memory control unit 15, a clock generator 17, a CCD control unit 19 and an AFE control unit 21 are built-in in addition to the data sampling control unit 11. A memory 23 (i.e. a RAM) for storing pixel data and an EEPROM 24 for storing a variety of setting information about the image reading apparatus 1 are provided outside the ASIC 10. In addition, a transfer clock generator 27 is provided between the CCD control unit 19 and the CCD image sensor 3.

The data sampling control unit 11 deletes pixel data unnecessary to be stored in the memory 23 from among the pixel data which is output from the analog frontend IC 5, and provides the remaining pixel data to the memory control unit 15.

The memory control unit 15 designed to control writing of pixel data and reading of pixel data sequentially writes the pixel data provided from the data sampling control unit 11 to a predetermined area of the memory 23, and reads out the pixel data stored in the memory 23 according to a command by the CPU 13 and outputs the read-out data to an external image forming apparatus 25.

The clock generator 17 generates reference clock signals to make the respective portions in the CCD image sensor 3, the analog frontend IC 5 and the ASIC 10 operate synchronously.

The CCD control unit 19 controls the driving of the CCD image sensor 3 according to the reference clock signals obtained from the clock generator 17.

The AFE control unit 21 performs a variety of setting at the analog frontend IC 5 as well as offset adjustment and gain adjustment.

Figure 2:
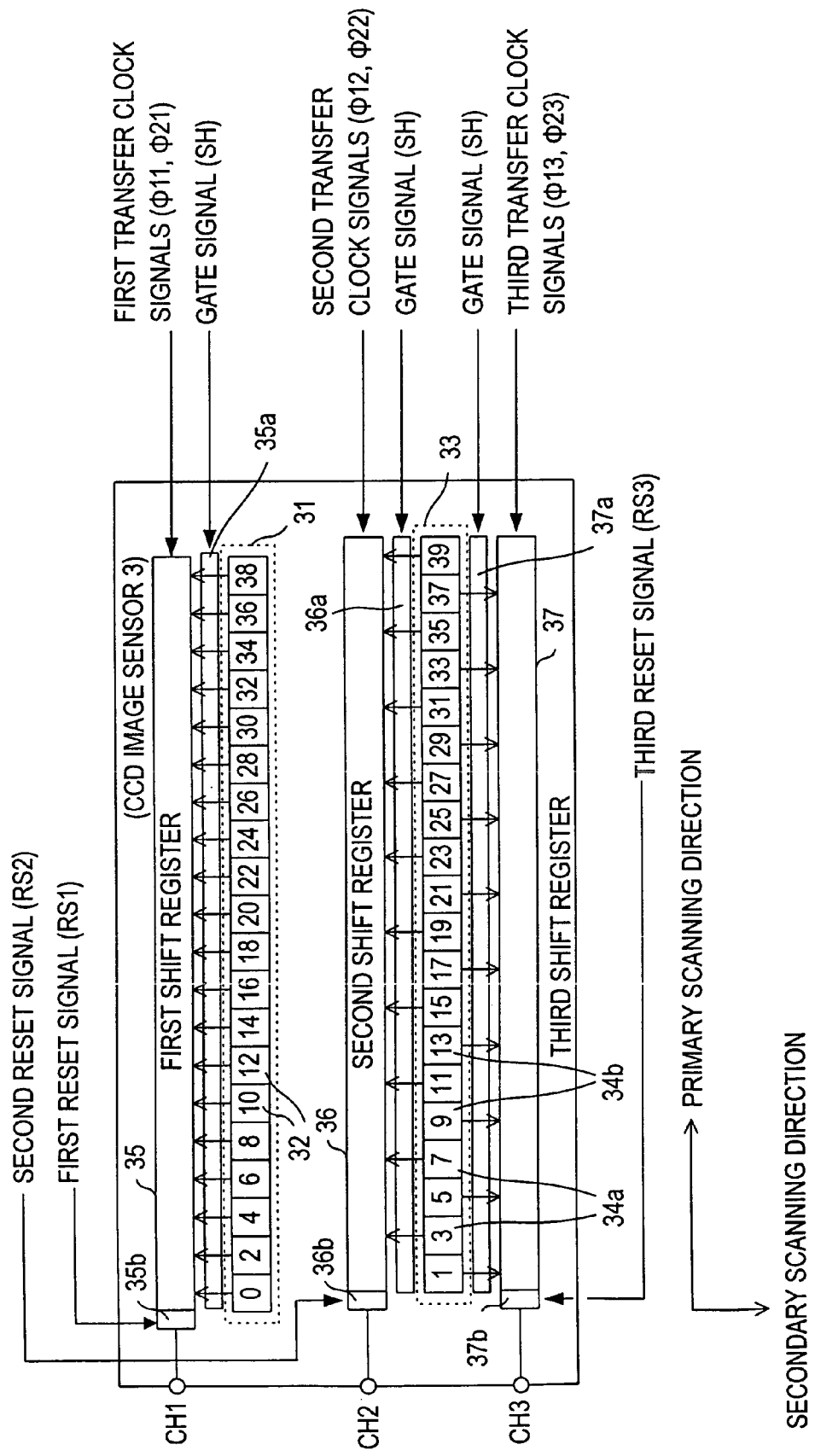
FIG. 2 is an explanatory view showing the schematic configuration of a CCD image sensor.

The internal configuration of the CCD image sensor 3 whose driving is controlled by the CCD control unit 19 is specifically as shown in FIG. 2.

The CCD image sensor 3 of the present embodiment is provided with a first sensor 31, a second sensor 33, a first shift register 35, a second shift register 36 and a third shift register 37, and serves as a so-called monochrome CCD image sensor.

The first sensor 31 has a plurality of light receiving elements 32 (i.e. photo diodes) arranged in a primary scanning direction. The second sensor 33 has a plurality of light receiving elements 34a, 34b (i.e. photo diodes) arranged in the primary scanning direction, and is disposed in parallel with and at a predetermined distance (e.g. by 6 lines) away from the first sensor 31 in a secondary scanning direction.

The respective light receiving elements 34a, 34b constituting the second sensor 33 have respective light receiving positions that are set to be at a predetermined distance away from the first sensor 31 in the secondary scanning direction and to be shifted by a half pixel with respect to the respective light receiving elements 32 constituting the first sensor 31.

In other words, the light receiving elements 32 and the light receiving elements 34a, 34b in the CCD image sensor 3 are mutually shifted by a half pixel from the beginning end to the finishing end in the primary scanning direction to give a so-called zigzag arrangement.

In the image reading apparatus 1 of the present embodiment, the resolution in the primary scanning direction can be artificially improved by writing the pixel signals obtained from the CCD image sensor 3 into the memory 23 according to the order of the numbers indicated on the respective light receiving elements shown in FIG. 2.

The shift registers 35 to 37 are constituted by known two-phase drive CCD shift registers.

Specifically, the first shift register 35 obtains through a shift gate 35a the respective pixel signals (i.e. signal charges) output from the respective light receiving elements 32 for the respective pixels constituting the first sensor 31 as the result of receiving light, and transfers the respective pixel signals to the output end of the first shift register 35 according to first transfer clock signals $\phi 11$, $\phi 21$ from the CCD control unit 19, and then outputs the pixel signals from the output end according to the order of arrangement of the corresponding light receiving elements 32. As may be known, the transfer is performed in the first shift register 35 with a frequency corresponding to the input first transfer clock signals $\phi 11$. The transfer is performed at the time when the first transfer clock signals $\phi 11$ is switched from H(high) signals to L(low) signals, and then the signal charges as pixel signals are output from the first shift register 35 (see FIG. 5).

On the other hand, the second shift register 36 obtains pixel signals through a shift gate 36a from the respective light receiving elements 34a arranged at even-numbered positions among the light receiving elements 34a, 34b for the respective pixels constituting the second sensor 33, and transfers the respective pixel signals to the output end of the second shift register 36 according to second transfer clock signals $\phi 12$, $\phi 22$ from the CCD control unit 19, and then outputs the pixel signals from the output end according to the order of arrangement of the corresponding light receiving elements 34a. The transfer is performed in the second shift register 36 with a frequency corresponding to the second transfer clock signals $\phi 12$. The transfer is performed at the time when the second transfer clock signals $\phi 12$ is switched from H signals to L signals, and then the signal charges as pixel signals are output from the output end of the second shift register 36.

In addition, the third shift register 37 obtains pixel signals through a shift gate 37a from the respective light receiving elements 34b arranged at odd-numbered positions among the light receiving elements 34a, 34b for the respective pixels constituting the second sensor 33, and transfers the respective pixel signals to the output end of the third shift register 37 according to third transfer clock signals φ13, φ23 from the CCD control unit 19, and then outputs the pixel signals from the output end according to the order of arrangement of the corresponding light receiving elements 34b. The transfer is performed in the third shift register 37 with a frequency corresponding to the third transfer clock signals φ13. At the time when the third transfer clock signals φ13 is switched from H signals to L signals, the signal charges as pixel signals are output from the output end of the third shift register 37.

In the CCD image sensor 3 constituted as above, the pixel signals corresponding to the even-numbered pixels in the primary scanning direction are output in order from the first channel (CH1) connected to the first shift register 35, the pixel signals corresponding to the pixels in the (4 m−1)th positions (m: natural number of 1 or more) in the primary scanning direction are output in order from the second channel (CH2) connected to the second shift register 36, and the pixel signals corresponding to the pixels in the (4 m−3)th positions (m: natural number of 1 or more) in the primary scanning direction are output in order from the third channel (CH3) connected to the third shift register 37, under the control of the CCD control unit 19.

At the respective output ends of the shift registers 35, 36, 37, known conversion circuits 35b, 36b, 37b for converting signal charges output as pixel signals by the shift registers 35, 36, 37 into analog voltages. Each of the conversion circuits 35b, 36b, 37b includes a condenser for converting the signal charges into analog voltages and outputs the signals indicating the voltages of the condenser. The conversion circuits 35b, 36b, 37b reset the voltages of the respective condensers when reset signals (RS1, RS2, RS3) are switched from L(low) signals to H(high) signals.

In the conversion circuits 35b, 36b, 37b, when the transfer clock signals φ11, φ12, φ13 are switched from H(high) signals to L(low) signals, the voltages of the condensers change due to influx of signal charges from the shift registers 35, 36, 37. The voltage differences (see FIG. 5) between before and after the change, which correspond respectively to the signal charges output from the shift registers 35, 36, 37, are measured by after-mentioned correlated double sampling circuits (CDS) 41 to 43 in the analog frontend IC 5.

The CCD control unit 19 in the present embodiment generates gate signals SH for controlling the timing to provide signal charges generated in the sensors 31, 33 to the shift registers 35, 36, 37, based on the reference clock signal of the clock generator 17, then provides the gate signals SH to the respective shift gates 35a, 36a, 37a.

The CCD control unit 19 also generates reference transfer clock signals φ1, φ2 which are in reverse phase with each other and a reference reset signal RS as control signals for controlling transfer operation of the shift registers 35, 36, 37. By providing the above signals to the transfer clock generator 27 provided outside of the ASIC 10, the CCD control unit 19 makes the transfer clock generator 27 generate the first to third transfer clock signals and the first to third reset signals, and controls the transfer operation of the shift registers 35, 36, 37 using these transfer clock signals and the reset signals.

Figure 3:
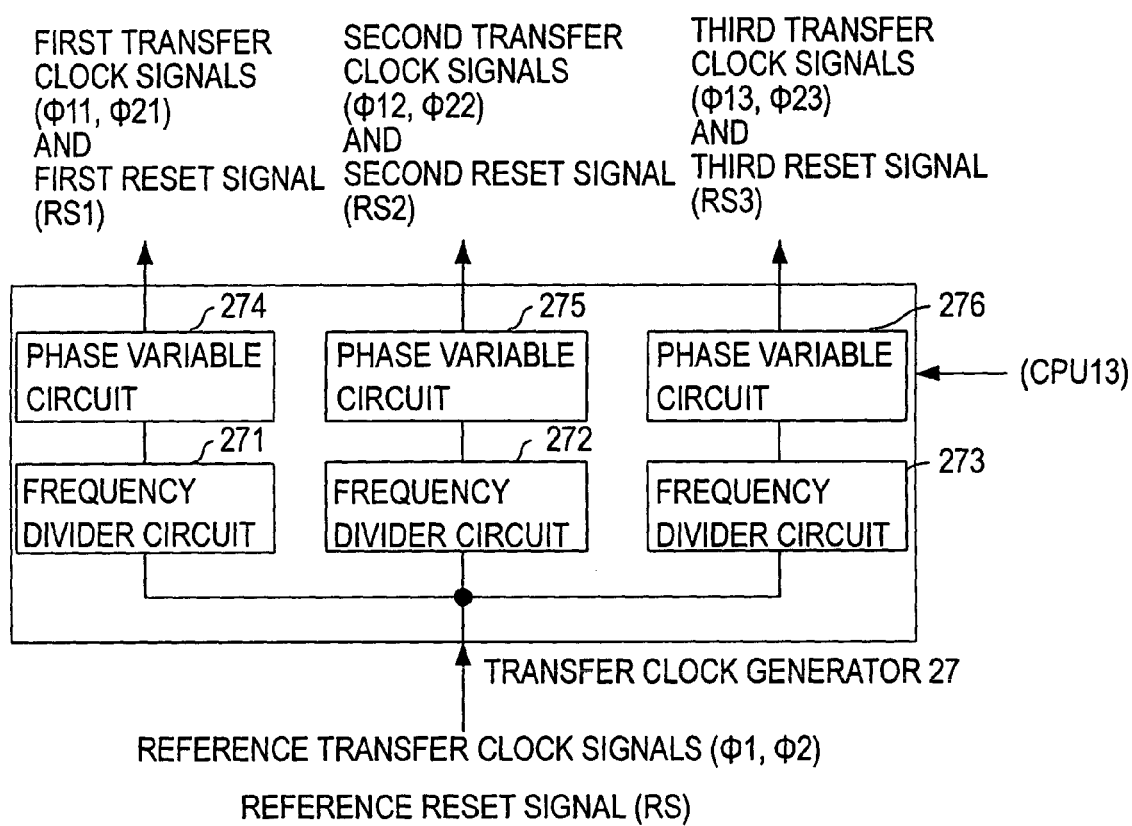
FIG. 3 is a block diagram showing the schematic configuration of a transfer clock generator.

FIG. 3 is a block diagram showing the schematic configuration of the transfer clock generator 27.

In the transfer clock generator 27, the reference transfer clock signals φ1, φ2 and the reference reset signal RS are provided to respective frequency divider circuits 271 to 273 and respective phase variable circuits 274 to 276, and then first transfer clock signals φ11, φ21 and a first reset signal RS1 for controlling the first shift register 35, second transfer clock signals φ12, φ22 and a second reset signal RS2 for controlling the second shift register 36, and third transfer clock signals φ13, φ23 and a third reset signal RS3 for controlling the third shift register 37 are generated. These signals are provided to the corresponding shift registers 35 to 37 and the conversion circuits 35b, 36b, 37b in the CCD image sensor 3 to achieve transfer operation and output operation of the shift registers 35 to 37.

Since the conditions for setting the frequency divide rate and the phase angle in the frequency divider circuit and in the phase variable circuit are determined for each of the shift registers 35 to 37, three frequency divider circuits and three phase variable circuits corresponding to the shift registers 35 to 37 are shown in FIG. 3. However, this does not indicate the actual number of required circuits. In the transfer clock generator 27, frequency divider circuits and phase variable circuits should be arranged depending on the variability of the conditions for setting the frequency divide rate and the phase angle.

Figure 4:
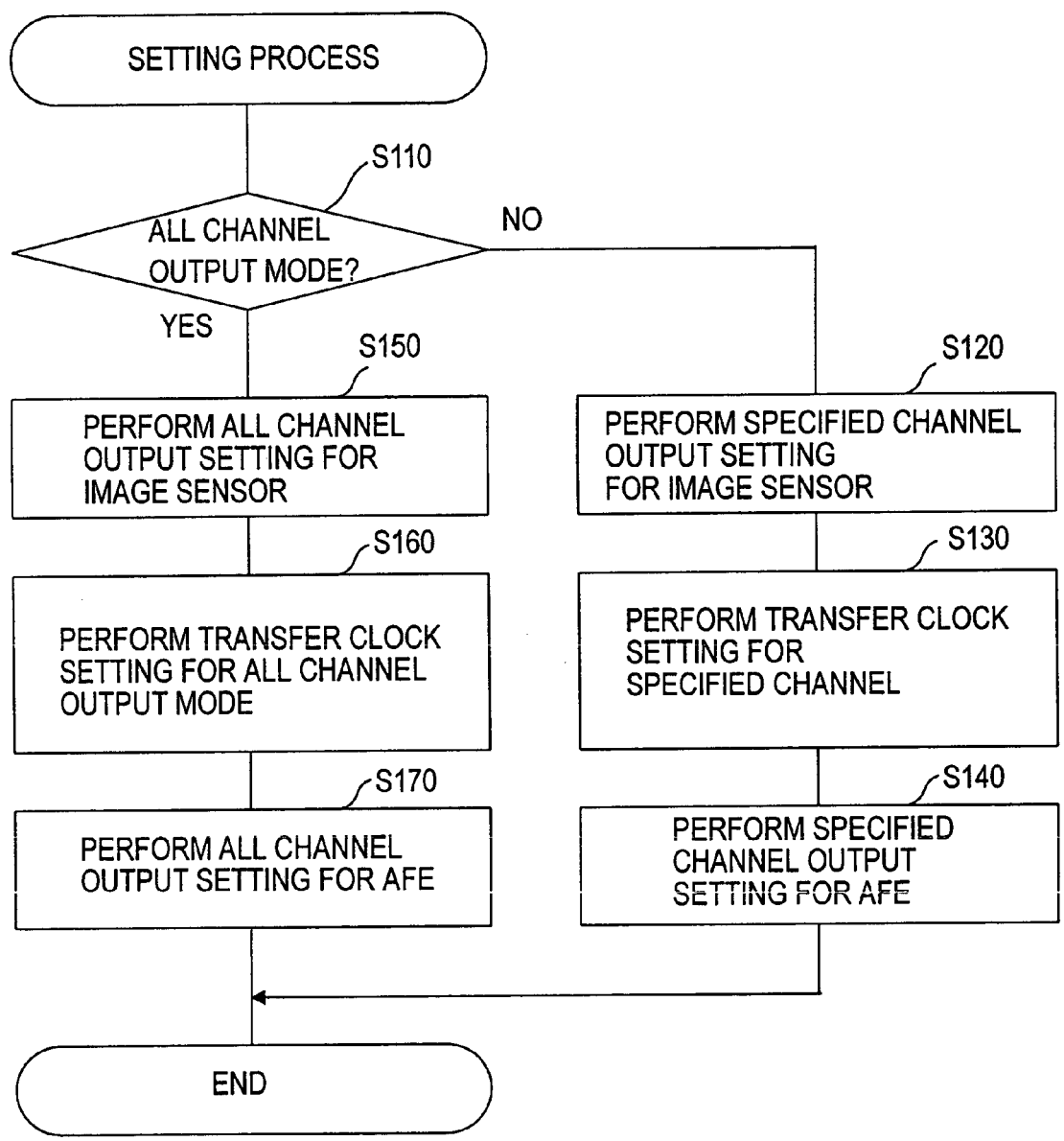
FIG. 4 is a flowchart showing the setting process executed by a CPU.

FIG. 4 is a flowchart showing the setting process executed by the CPU 13. The frequency divide rates in the frequency divider circuits 271 to 273 and the phase angles shifting in the phase variable circuits 274 to 276 in the transfer clock generator 27 of the present embodiment are set by the CPU 13. The CPU 13 executes the setting process when an image read command is input from the outside.

When the process is started, the CPU 13 first determines whether or not the read command is a read command in an all channel output mode (S110). If it is determined to be not ("No" in S110), the CPU 13 makes a setting to provide transfer clock signals only to the shift register of the channel specified through the CCD control unit 19 and thereby to output only the pixel signals of the channel specified in conjunction with the read command (S120). It should of course be understood that it is not always required to prevent the transfer clock signals from being provided to the shift registers of other channels than the specified channel, and that only the after-mentioned output setting of the analog frontend IC 5 (S140) may be enough.

Following the processing in S120, the CPU 13 sets the frequency divide rates in the frequency divider circuits 271 to 273 and the phase angles in the phase variable circuits 274 to 276 to respective predetermined values (S130). The predetermined values, i.e. the values to be set in S130, are previously stored on the EEPROM 24.

Examples of not being in the all channel output mode are the case of generating image data using only the output signals of the first channel (CH1) and the case of generating image data using only the output signals of the second channel (CH2) in the low resolution mode.

Following the processing in S130, the CPU 13 performs the after-mentioned operation setting of the multiplexer 7 in the analog frontend (AFE) IC 5 through the AFE control unit 21 to make the pixel signals from the shift register corresponding to the specified channel among the shift registers 35 to 37 be output from the analog frontend IC 5 (S140), then the present setting process is terminated.

On the other hand, if it is determined that the read command is a read command in the all channel output mode ("Yes" in S110), the CPU 13 makes the pixel signals of all the channels output from the CCD image sensor 3 (S150), and then sets the frequency divide rates and the phase angles for the all channel output mode at the transfer clock generator 27 (S160).

Specifically, the CPU 13 sets the frequency divide rate in the frequency divider circuit 271 and the phase angle in the phase variable circuits 274 in the transfer clock generator 27 such that the reference transfer clock signals φ1, φ2 are output as they are as the first transfer clock signals φ11, φ21, and the reference reset signal RS is output as it is as the first reset signal RS1.

The CPU 13 also sets the frequency divide rate in the frequency divider circuit 272 and the phase angle in the phase variable circuits 275 such that the transfer clock generator 27 generates the second transfer clock signals φ12, φ22 by halving the frequency of the reference transfer clock signals φ1, φ2 while generating the second reset signal RS2 having half the frequency and pulses occurring a half cycle late relative to the reference reset signal RS.

Further, the CPU 13 sets the frequency divide rate in the frequency divider circuit 273 and the phase angle in the phase variable circuits 276 such that the transfer clock generator 27 generates the third transfer clock signals φ13, φ23 having the same frequency and being in reverse phase relative to the second transfer clock signals φ12, φ22 while generating the third reset signal RS3 having half the frequency and pulses occurring a half cycle early relative to the reference reset signal RS.

Once the setting of the frequency divide rates and the phase angles has been completed, the CPU 13 performs various settings regarding the analog frontend IC 5 through the AFE control unit 21 such that the multiplexer 7 selectively outputs the pixel signals according to the order of the light receiving positions of the corresponding light receiving elements 32, 34a, 34b through the after-mentioned MUX control unit 61 (see FIG. 6) in the analog frontend IC 5 (S170). When the settings have been completed, the present process is terminated.

Figure 5:
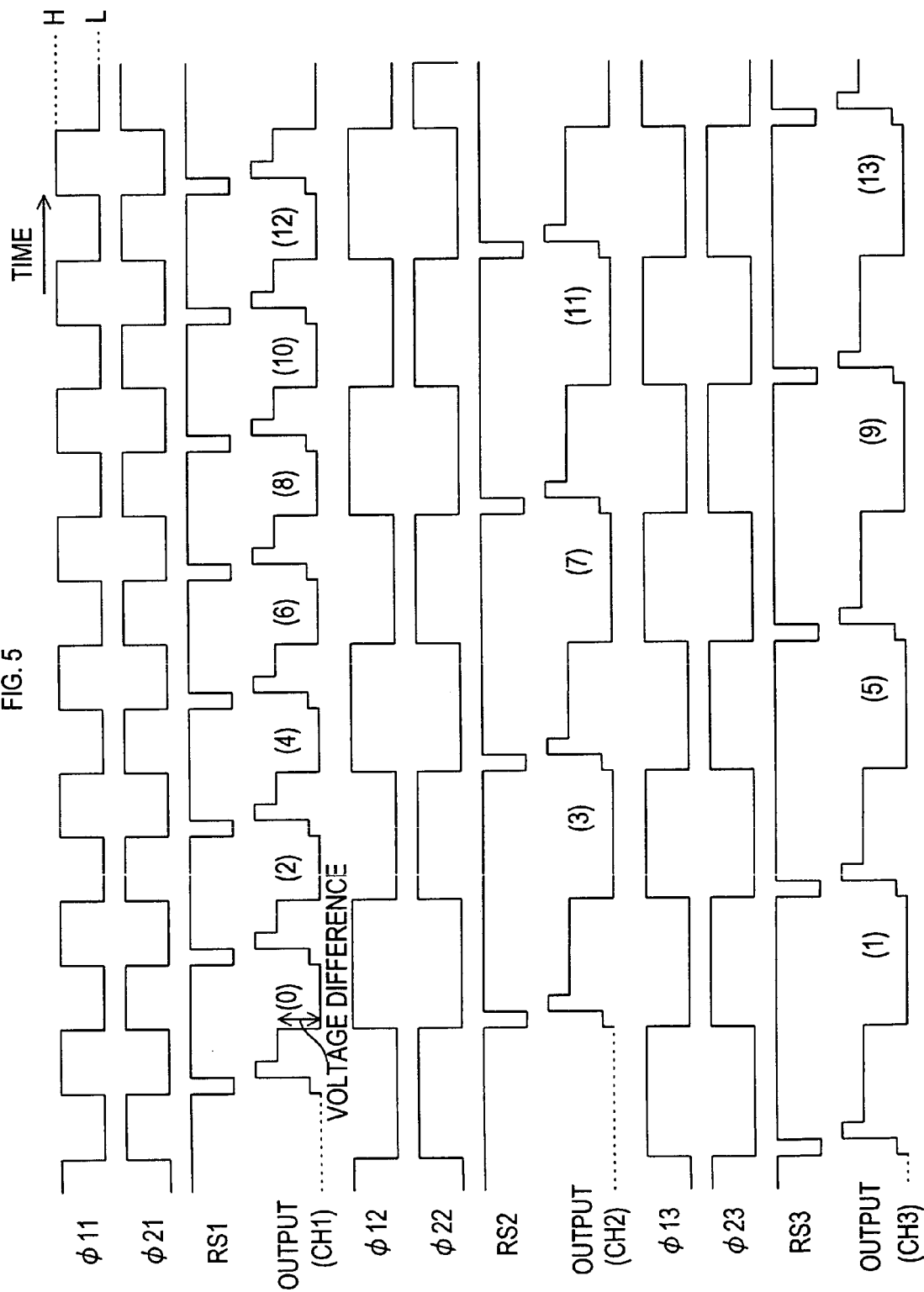
FIG. 5 is a time chart showing the state of signals output from the CCD image sensor.

FIG. 5 is a time chart showing the state of signals output from the respective channels of the CCD image sensor 3, when the CCD control unit 19 provides the reference transfer clock signals φ1, φ2 and the reference reset signal RS to the transfer clock generator 27 and executes the control of the CCD image sensor 3 after the setting of the frequency divide rate and the phase angle for the all channel output mode is completed by the CPU13.

With the settings at the transfer clock generator 27 as above, in the all channel output mode, the transfer timing of the pixel signals in the second shift register 36 is shifted by a half cycle relative to the transfer timing in the third shift register 37, and the second and third shift registers 36, 37 operate with a transfer cycle 2T which is double the transfer cycle T of the pixel signals in the first shift register 35. Accordingly, the pixel signals are output from the respective channels of the CCD image sensor 3 with the timings corresponding to the respective transfer cycles and phase shifts.

Numbers in parentheses in FIG. 5 stand for the light receiving positions in the primary scanning direction of the light receiving elements 32, 34a, 34b corresponding to respective pixel signals (i.e. the pixel positions in the primary scanning direction). The numbers assigned to the respective light receiving elements 32, 34a, 34b in FIG. 2 correspond to the numbers in FIG. 5. As may be understood by comparing FIG. 2 and FIG. 5, the pixel signals indicating the results of light reception by the light receiving elements 32, 34a, 34b are output from the CCD image sensor 3 according generally to the order of the light receiving positions in the primary scanning direction of the light receiving elements 32, 34a, 34b.

The detailed configuration of the analog frontend IC 5 that receives output signals from the CCD image sensor 3 will now be described with reference to FIG. 6.

The analog frontend IC 5 is provided mainly with correlated double sampling circuits (CDS) 41 to 43, offset adjustment circuits 44 to 46, programmable gain amplifiers (PGA) 47 to 49, the above-mentioned multiplexer (MUX) 7, the the above-mentioned analog/digital converter (ADC) 9, an interface 53, a register unit 55 and the MUX control unit 61. The analog frontend IC 5 has three channels, and the correlated double sampling circuits 41 to 43, the offset adjustment circuits 44 to 46 and the programmable gain amplifiers 47 to 49 are provided for the respective channels.

The interface 53 is for writing a variety of data from an external device such as the AFE control unit 21 into the register unit 55.

The correlated double sampling circuits 41 to 43, which are provided for eliminating components or the like that could be a source of noise or error from the pixel signals obtained from the CCD image sensor 3, are connected to the input ends of the respective channels (CH1, CH2, CH3). As is commonly known, the correlated double sampling circuits 41 to 43 eliminate error voltages caused by the charges to the condensers when the transfer clock signals of the shift registers are switched from L (low) signals to H (high) signals, by sampling the pixel signals output from the CCD image sensor 3 twice at a certain time interval.

According to the present embodiment as described above, when the transfer clock signals φ11, φ12, φ13 are switched from H signals to L signals, signal charges flow into the conversion circuits 35b, 36b, 37b from the shift registers 35 to 37, and thereby the output voltages from the CCD image sensor 3 are changed. The correlated double sampling circuits 41 to 43 read the voltages before and after the change, and output the voltage differences as pixel signals. The output signals from the correlated double sampling circuits 41 to 43 are provided to the offset adjustment circuits 44 to 46 of the corresponding channels.

The offset adjustment circuits 44 to 46 including digital/analog converters (DAC) 44a, 45a, 46a and adders 44b, 45b, 46b, respectively, add offset voltages to the input signals of the respective channels (CH1, CH2, CH3). Offset registers 57 provided in the register unit 55 store set offset values for the respective channels which indicate the offset voltages added by the offset adjustment circuits 44 to 46. The offset adjustment circuits 44 to 46 of the respective channels add the offset voltages corresponding respectively to the set offset values stored in the offset registers 57 to the pixel signals transmitted from the correlated double sampling circuits 41 to 43, and provide the pixel signals with the offset voltages added to the programmable gain amplifiers 47 to 49 of the corresponding channels.

The programmable gain amplifiers 47 to 49, which are known analog amplifiers capable of adjusting the gain with respect to an input signal, are provided downstream from the respective offset adjustment circuits 44 to 46. Gain registers 58 provided in the register unit 55 store set gain values for the respective channels which indicate the gains to be set at the respective programmable gain amplifiers 47 to 49. The respective programmable gain amplifiers 47 to 49 of the respective channels amplify the pixel signals of the corresponding channels provided from the CCD image sensor 3 through the offset adjustment circuits 44 to 46 by the gains in accordance with the respective set gain values stored in the gain registers 58, and provide the amplified pixel signals to the multiplexer 7. The programmable gain amplifiers are hereinafter referred to simply as the "amplifiers."

The multiplexer 7 has three input channels and one output channel. The respective input channels are connected to the output ends of the corresponding amplifiers 47 to 49, and the output channel is connected to the analog/digital converter 9. The multiplexer 7, which is designed to select one of the input signals from the amplifiers 47 to 49 based on a set value in a register 59 or trigger signals MUX-A, MUX-B, MUX-C from the MUX control unit 61, provides the pixel signals amplified by the respective amplifiers 47 to 49 into the analog/digital converter 9.

Specifically, when the set value indicating an output channel is stored in the register 59, the multiplexer 7 provides the pixel signals output from the amplifier of the channel corresponding to the set value among the amplifiers 47 to 49 to the analog/digital converter 9.

Figure 7:
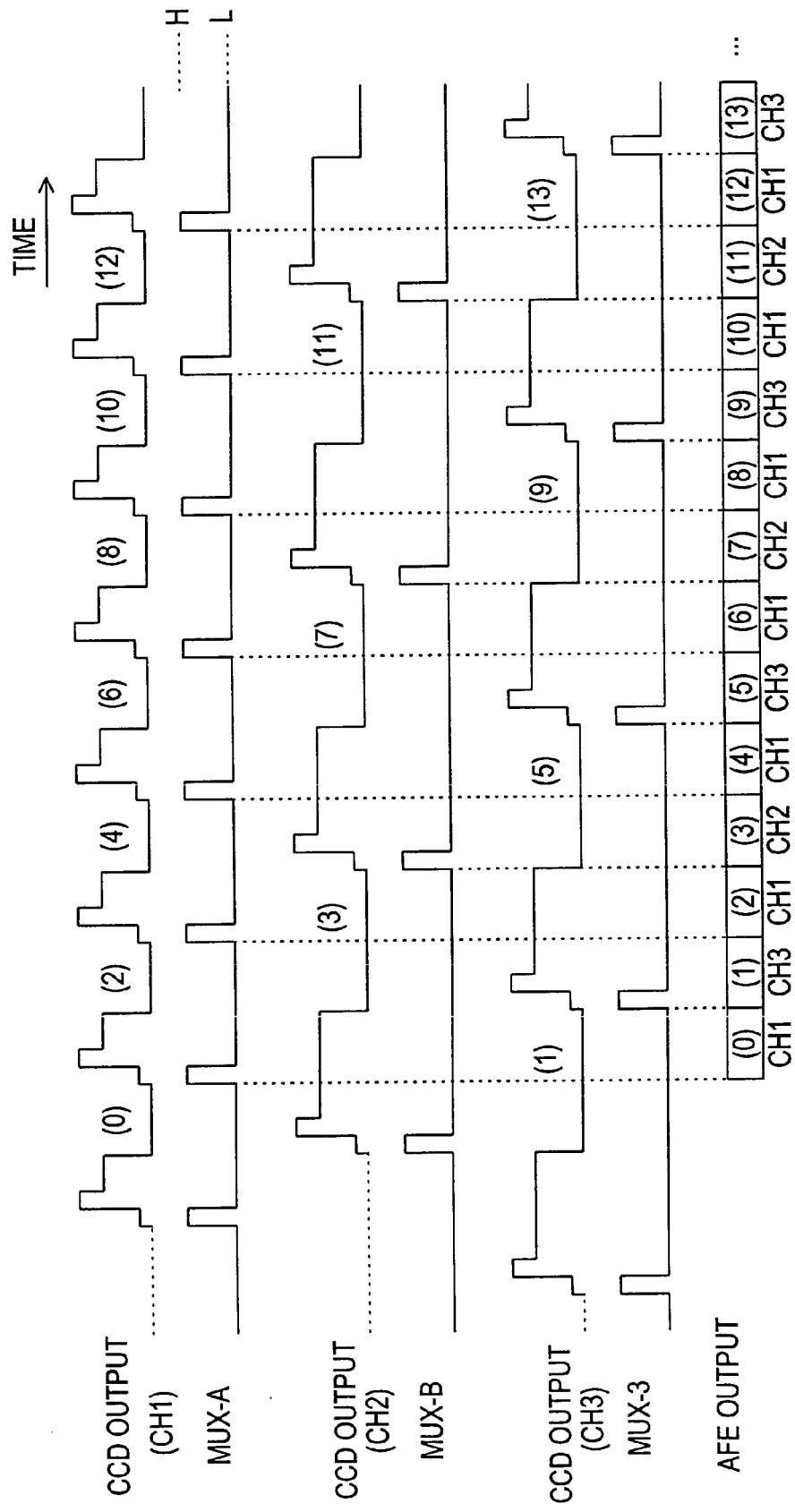
FIG. 7 is a time chart showing the state of trigger signals output from an MUX control unit.
Figure 8:
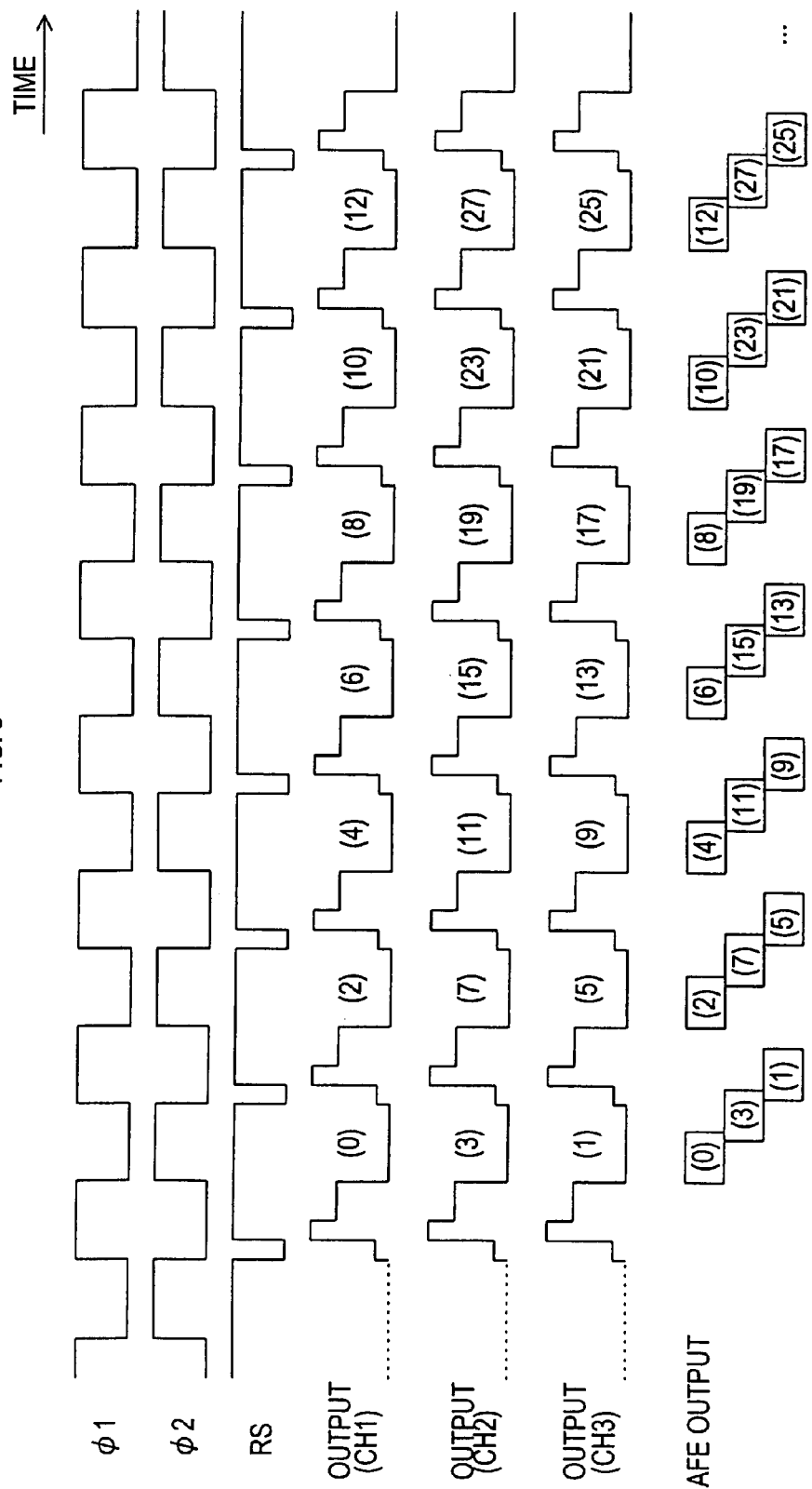
FIG. 8 is a time chart showing the state of output from the CCD image sensor in a prior art apparatus.

On the other hand, in the all channel output mode, the multiplexer 7 switches the output in accordance with the trigger signals MUX-A, MUX-B, MUX-C from the MUX control unit 61 due to the above-mentioned setting by the AFE control unit 21 in S170. FIG. 7 is a time chart showing the time relationship between the pixel signals output from the respective channels of the CCD image sensor 3 and the trigger signals output from the MUX control unit 61.

The MUX control unit 61 generates trigger pulses with a cycle period T as a first trigger signal MUX-A by providing the reference clock signal to a frequency divider circuit 63 and a phase variable circuit 65. The MUX control unit 61 also generates trigger pulses with a cycle period 2T (the double of T) and a half cycle (T/2) late relative to the first trigger signal as a second trigger signal MUX-B as well as trigger pulses with a cycle period 2T (the double of T) and a half cycle (T/2) early relative to the first trigger signal as a third trigger signal MUX-C, and provides these trigger pulses to the multiplexer 7.

When the first trigger signal MUX-A is switched to H signal (i.e. the trigger pulse is provided), the multiplexer 7 electrically connects the amplifier 47 of the first channel and the analog/digital converter 9 to provide the output signal of the amplifier 47 to the analog/digital converter 9. When the third trigger signal MUX-C is switched to H signal, the multiplexer 7 electrically connects the amplifier 49 of the third channel and the analog/digital converter 9 to provide the output signal of the amplifier 49 to the analog/digital converter 9.

When the first trigger signal MUX-A is switched to H signal again, the multiplexer 7 provides the output signal of the amplifier 47 of the first channel to the analog/digital converter 9, and when the second trigger signal MUX-B is switched to H signal, the multiplexer 7 connects the amplifier 48 of the second channel and the analog/digital converter 9 to provide the output signal of the amplifier 48 to the analog/digital converter 9.

That is, the multiplexer 7 of the present embodiment outputs the pixel signals of the first channel and the pixel signals of the third channel, and the pixel signals of the first channel and the pixel signals of the second channel alternately in accordance with the transfer cycle T of the first shift register 35 to provide the pixel signals to the analog/digital converter 9. In this case, the multiplexer 7 outputs the pixel signals of the second channel and the third channel with the output timing shifted by a half cycle relative to the output timing of the pixel signals of the first channel (i.e. right in the middle of the respective outputs of the pixel signals of the first channel).

This operation enables the multiplexer 7 to selectively output the pixel signals according to the order corresponding to the pixel arrangement in the CCD image sensor 3 (i.e. according to the order corresponding to the light receiving positions of the light receiving elements 32, 34a, 34b).

The analog pixel signals output from the multiplexer 7 are converted into digital signals (pixel data) by the analog/digital converter 9 and are output. The output end of the analog/digital converter 9 is connected to the data sampling control unit 11, and the pixel data is provided from the analog frontend IC 5 to the data sampling control unit 11 according to the order corresponding to the pixel arrangement (see the bottom part of FIG. 7).

In the image reading apparatus 1 of the present embodiment as described above, the second and third transfer clock signals have the double cycle period compared with the first transfer clock signal, and the third transfer clock signal is shifted by a half cycle (phase $\pi$) relative to the second transfer clock signal. Accordingly, the transfer timing of the pixel signals in the second shift register 36 is shifted by a half cycle relative to the transfer timing in the third shift register 37, while the second shift register 36 and the third shift register 37 operate with a transfer cycle which is double the transfer cycle of the pixel signals in the first shift register 35. Thus, it is possible to make the order of the pixel signals output from the respective shift registers 35 to 37 generally follow the order of arrangement in the primary scanning direction of the light receiving elements 32, 34a, 34b constituting the first and second sensors 31, 33.

Also in the image reading apparatus 1, in which the pixel signals output from the respective shift registers 35 to 37 are provided to the amplifiers 47 to 49 of the corresponding channels in the analog frontend IC 5 to be amplified, the analog pixel signals can be converted into digital pixel data appropriately through the analog/digital converter 9.

Furthermore, in the image reading apparatus 1, in which the MUX control unit 61 controls the multiplexer 7 to selectively provide the pixel signals obtained from the amplifiers 47 to 49 to the analog/digital converter 9 according to the order of the light receiving positions in the primary scanning direction of the light receiving elements 32, 34a, 34b, it is possible to provide serial data with an arrangement of the pixel data according to the order of the corresponding pixel arrangement in the primary scanning direction from the analog frontend IC 5 to the data sampling control unit 11.

Accordingly, in the image reading apparatus 1, the pixel data may be stored in the memory 23 according to the order of the pixel arrangement. Then, during the subsequent image processing of the pixel data (including image forming process), it is not necessary to rearrange the pixel data in the primary scanning direction, which allows rapid image processing.

In the image reading apparatus 1 of the above-described embodiment, it is necessary to rearrange the pixel data in the secondary scanning direction through the memory control unit 15, for example, since the second sensor 33 is at the distance of several pixels from the first sensor 31 in the secondary scanning direction. However, since it is not necessary to rearrange the pixel data at least in the primary scanning direction, rapid image processing (including image forming process) is surely achieved by the image reading apparatus 1.

In addition, according to the image reading apparatus 1 of the present embodiment, in which the output of the multiplexer 7 is switched with a cycle which is half the transfer cycle of (i.e. with a frequency double of) the first shift register 35, buffering of the output from the amplifiers 47 to 49 for several pixels is not necessary, which enables the pixel data to be output according to the order of the pixel arrangement rapidly and inexpensively with a simple configuration of the apparatus.

Although the present invention has been described in connection with the embodiment above, an image reading apparatus according to the present invention is not limited to the embodiment but may have a various forms.

Figure 6:
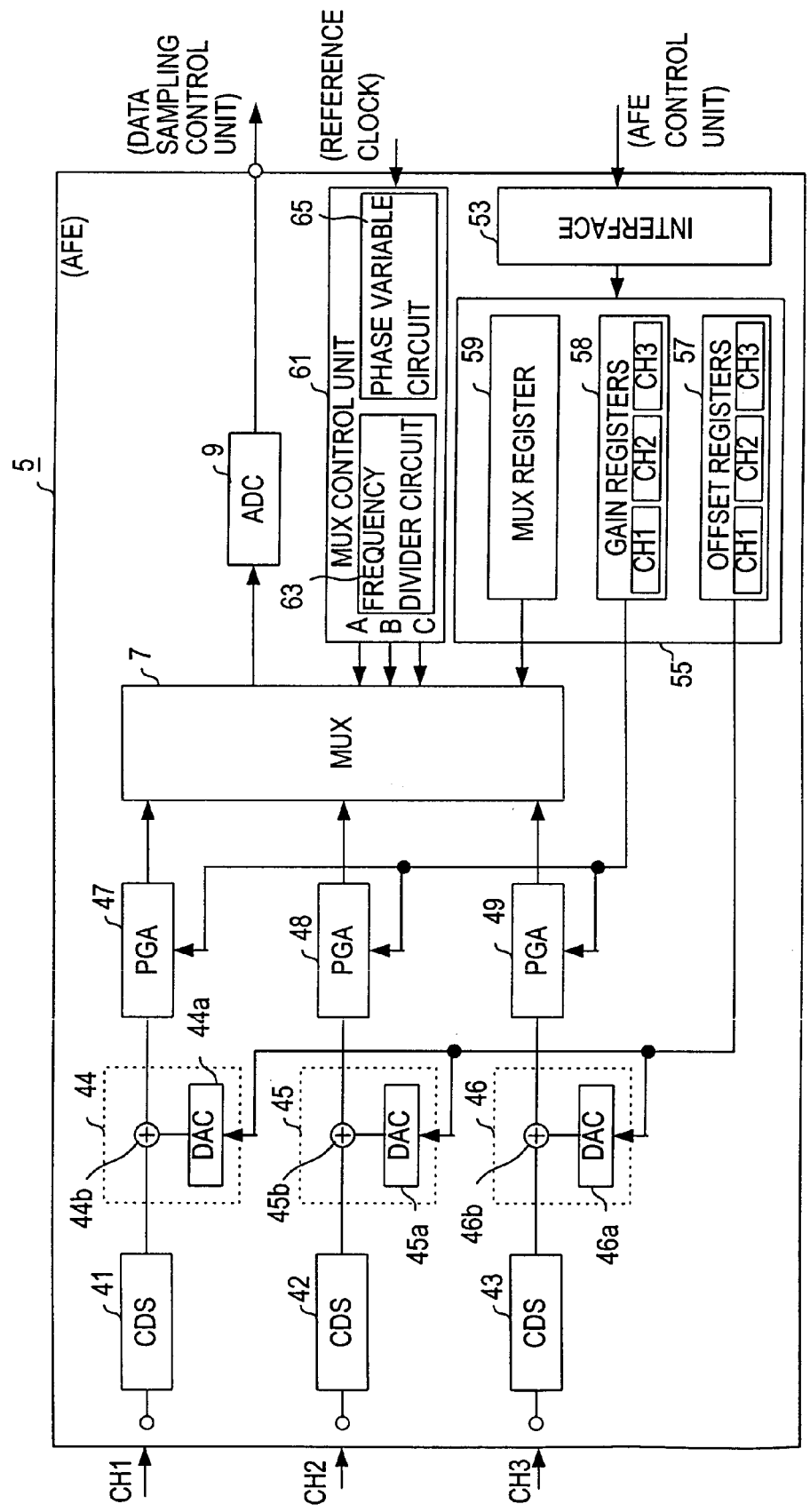
FIG. 6 is a schematic block diagram showing the internal configuration of an analog frontend IC.

While the analog frontend IC 5 having the configuration in FIG. 6 is employed in the image reading apparatus 1 of the present embodiment, an analog frontend IC may have a variety of similar configurations. In other words, any analog frontend IC with a different configuration may be employed as long as it allows the selective output operation of the multiplexer as described above.

While different transfer clock signals are provided to the respective shift registers in the all channel output mode in the present embodiment, the image reading apparatus may also allow input of the same transfer clock signals into the respective shift registers. In the case where the CCD image sensor 3 has a color CCD image sensor built-in, for example, it is required to input the same transfer clock signals into the image sensor regarding the color CCD image sensor.

It is to be understood that the half cycle shift of the transfer clock signals and the trigger signals need not be exact but may fluctuate to some degree.

What is claimed is:

1. An image reading apparatus that reads an image from the outside by controlling an image sensor, comprising:
    the image sensor including:
        a first sensor having light receiving elements for respective pixels arranged in a primary scanning direction,
        a second sensor having light receiving elements for respective pixels which are arranged in the primary scanning direction and whose light receiving positions are set at a predetermined distance away from the first sensor in a secondary scanning direction and between the respective light receiving elements constituting the first sensor,
        a first shift register for transferring the respective pixel signals obtained from the respective light receiving elements constituting the first sensor and outputting the pixel signals according to the order of arrangement of the corresponding light receiving elements,
        a second shift register for transferring the respective pixel signals obtained from the respective light receiving elements arranged at even-numbered positions among the light receiving elements constituting the second sensor and outputting the pixel signals according to the order of arrangement of the corresponding light receiving elements, and
        a third shift register for transferring the respective pixel signals obtained from the respective light receiving elements arranged at odd-numbered positions among the light receiving elements constituting the second sensor and outputting the pixel signals according to the order of arrangement of the corresponding light receiving elements; and
    a transfer control device for shifting the transfer timing of the pixel signals in the second shift register by a half cycle relative to the transfer timing in the third shift register, while making the second and third shift registers operate with a transfer cycle which is the double of the transfer cycle of the pixel signals in the first shift register.

2. The image reading apparatus according to claim 1, further comprising a selective output device for obtaining the respective pixel signals output from the first, second and third shift registers and selectively outputting the obtained respective pixel signals to the outside according to the order of the light receiving positions of the light receiving elements corresponding to the pixel signals.

3. The image reading apparatus according to claim 2, wherein the selective output device outputs the pixel signals obtained from the first and second shift registers and the pixel signals obtained from the first and third shift registers alternately in accordance with the transfer cycle of the first shift register.

4. The image reading apparatus according to claim 3, wherein the selective output device outputs the pixel signals obtained from the second and third shift registers with an output timing shifted by a half cycle relative to the output timing of the pixel signals obtained from the first shift register.

5. The image reading apparatus according to claim 4,
    wherein the selective output device includes an analog frontend IC having at least three channels and provided internally with analog amplifiers for the respective channels capable of adjusting the gains with respect to analog input signals, an analog/digital converter for converting the analog input signals into digital signals and outputting the digital signals, and a multiplexer for providing one of the analog input signals amplified by the respective analog amplifiers to the analog/digital converter;
    and wherein the selective output device provides the respective pixel signals output from the first, second and third shift registers as the analog input signals to the analog amplifiers of the channels corresponding to the respective shift registers, and controls the multiplexer to selectively provide the respective pixel signals obtained from the respective amplifiers to the analog/digital converter according to the order of the light receiving positions of the light receiving elements corresponding to the respective pixel signals, whereby to selectively output the respective pixel signals to the outside through the analog/digital converter.

6. The image reading apparatus according to claim 3,
    wherein the selective output device includes an analog frontend IC having at least three channels and provided internally with analog amplifiers for the respective channels capable of adjusting the gains with respect to analog input signals, an analog/digital converter for converting the analog input signals into digital signals and outputting the digital signals, and a multiplexer for providing one of the analog input signals amplified by the respective analog amplifiers to the analog/digital converter;
    and wherein the selective output device provides the respective pixel signals output from the first, second and third shift registers as the analog input signals to the analog amplifiers of the channels corresponding to the respective shift registers, and controls the multiplexer to selectively provide the respective pixel signals obtained from the respective amplifiers to the analog/digital converter according to the order of the light receiving positions of the light receiving elements corresponding to the respective pixel signals, whereby to selectively output the respective pixel signals to the outside through the analog/digital converter.

7. The image reading apparatus according to claim 2,
    wherein the selective output device includes an analog frontend IC having at least three channels and provided internally with analog amplifiers for the respective channels capable of adjusting the gains with respect to analog input signals, an analog/digital converter for converting the analog input signals into digital signals and outputting the digital signals, and a multiplexer for providing one of the analog input signals amplified by the respective analog amplifiers to the analog/digital converter;

and wherein the selective output device provides the respective pixel signals output from the first, second and third shift registers as the analog input signals to the analog amplifiers of the channels corresponding to the respective shift registers, and controls the multiplexer to selectively provide the respective pixel signals obtained from the respective amplifiers to the analog/digital converter according to the order of the light receiving positions of the light receiving elements corresponding to the respective pixel signals, whereby to selectively output the respective pixel signals to the outside through the analog/digital converter.

* * * * *